United States Patent [19]

Pavelka et al.

[11] Patent Number: 4,720,858
[45] Date of Patent: Jan. 19, 1988

[54] TELEPHONE HANDSET/ACOUSTIC COUPLER ADAPTER

[75] Inventors: Ronald G. Pavelka, Orange; Oren J. Chesebro, Corona Del Mar, both of Calif.

[73] Assignee: MSI Data Corporation, Costa Mesa, Calif.

[21] Appl. No.: 824,857

[22] Filed: Jan. 31, 1986

[51] Int. Cl.⁴ .......................................... H04M 11/00
[52] U.S. Cl. .................................................. 379/444
[58] Field of Search .............. 179/2 C, 6.12; D14/57, D14/101; 379/78, 99, 443, 444

[56] References Cited

U.S. PATENT DOCUMENTS

| | | | |
|---|---|---|---|
| D. 270,834 | 10/1983 | Genaro et al. | D14/57 |
| D. 281,688 | 12/1985 | Owens, Jr. | D14/57 |
| 4,252,996 | 2/1981 | D'Agostino | 179/2 C |

Primary Examiner—Keith E. George
Attorney, Agent, or Firm—Spensley Horn Jubas & Lubitz

[57] ABSTRACT

An adapter is provided for use with acoustic coupler interface devices. The adapter allows a non-standard handset mouthpiece to be used with a mouthpiece muff configured for a standard configuration mouthpiece without extensive modification to either the non-standard handset or the mouthpiece muff.

3 Claims, 4 Drawing Figures

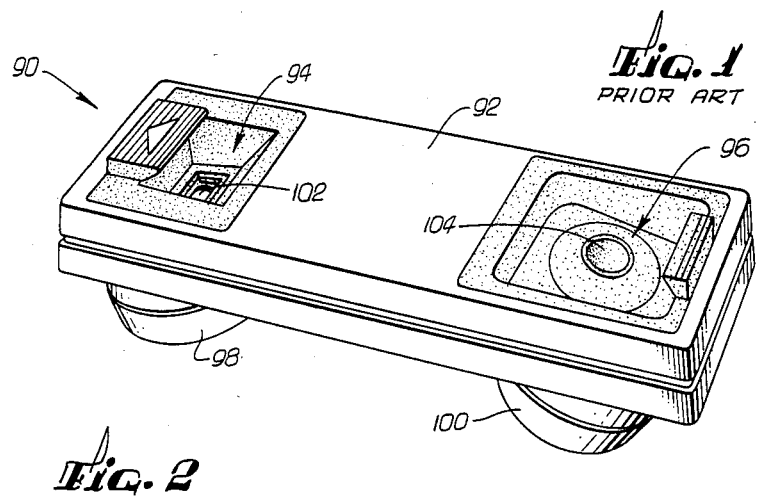
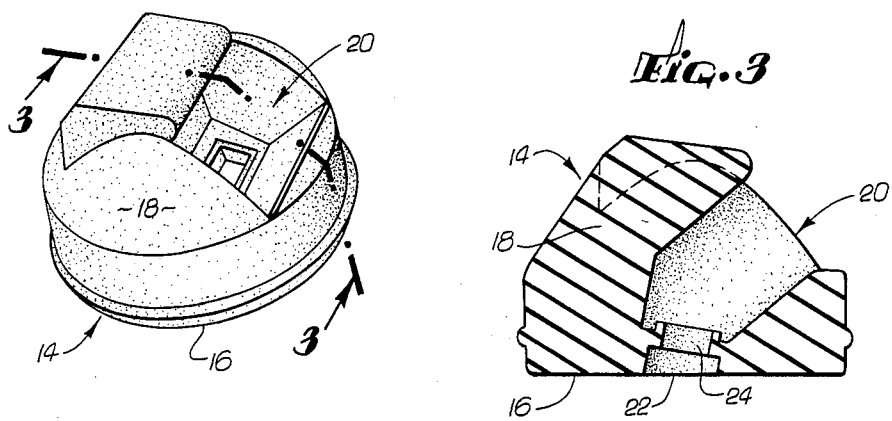
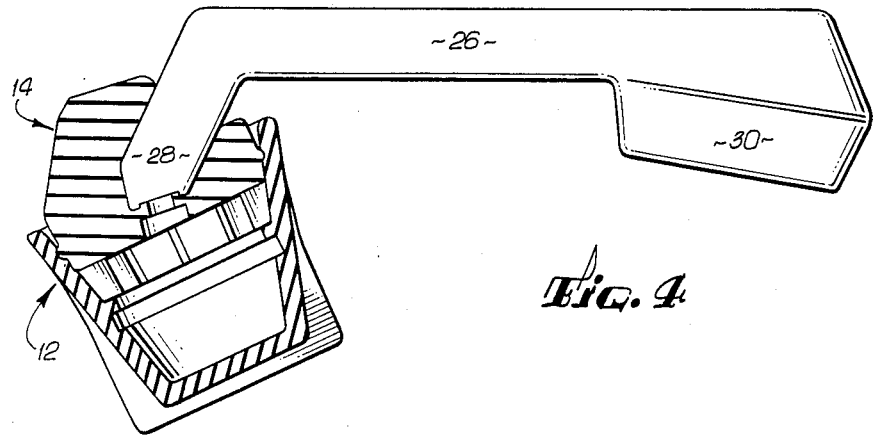

TELEPHONE HANDSET/ACOUSTIC COUPLER ADAPTER

BACKGROUND OF THE INVENTION

1. Field of the Invention

This invention relates to acoustically coupling new-design telephone handsets to acoustic couplers designed for use with "standard" telephone handsets.

2. Description of the Prior Art

It is common for users to communicate with digital computers via telephone lines using a system comprised of a data entry device coupled to an acoustic coupler interface device, which is in turn coupled to a telephone. The telephone is connected with the computer via telephone lines and interface devices. The acoustic coupler is generally comprised of a housing containing receiving and transmitting transducers and other electronic devices. The user inputs data or commands with the data entry device. The data or commands are translated into the appropriate sound pulses or tones by the acoustic coupler interface device and sent on to the computer. A reverse process is used to receive data or commands from the computer at the data entry device.

For quite some time, a standard configuration telephone handset has been in widespread use. The standard configuration handset is the familiar crescent-shaped handle with earpiece and mouthpiece at each end, each having a cylindrical cap. Acoustic coupler interface devices intended to acoustically couple telephone handsets so as to allow communication with a digital computer have been designed to physically interface with this type of handset. New handsets are becoming very popular but have a radically different design. The "AT&T MERLIN" handset is an example of such a handset. Prior to deregulation of the telephone industry, virtually every business in the United States was equipped solely with telephones having the standard configuration handsets. Thus, acoustic couplers have been designed to interface only with such handsets.

Acoustic coupler muffs designed for the standard configuration handset are shaped so as to provide good transmission and reception of audio signals via the handset and transducers. Such muffs are generally cup-shaped, having a flat, circular bottom portion with a wall rising from the circumference thereof. The muff fits snugly over the mouthpiece and earpiece of the standard configuration handset, sealing out extraneous noise and holding the handset in proper position. Thus, the receiving and transmitting transducers are placed the proper distance from the mouthpiece and earpiece, respectively, and are sealed from extraneous noise.

In contrast to the standard configuration mouthpiece, one particular new-style, non-standard configuration mouthpiece has a rectangular shape and is largely a continuation of the handset handle, the mouthpiece end having dimensions substantially equal to the dimensions of a cross-section of the handle. This style mouthpiece may be used with a standard muff only if one carefully grasps the acoustic coupler and the handset and firmly holds the two in the proper position. Even then, this does not isolate the coupler transducer from extraneous noise and requires the use of both hands.

Devices for enabling a new phone design to be used with couplers intended for use with standard phones have been introduced to the market. However, such devices are large, cumbersome, and do not provide a good acoustic interface. One such device, as illustrated in FIG. 1, consists of a cradle having two cavities on one side, into which the non-standard handset is placed. The opposite side of the cradle has two extensions, directly opposite the cavities, shaped as the mouthpiece and earpiece of the standard configuration handset. The relative angle between the two extensions matches the relative angle between the mouthpiece and earpiece of the standard configuration handset.

With increased use of new telephone systems due to deregulation of the telephone industry, many users will be able to use existing interface devices only by carefully grasping the handset and interface device and firmly holding the two in position or will be forced to retain standard configuration telephones. Even if one can physically grasp the new configuration telephones and place them in proper position on an existing acoustic coupler, it is impossible to acoustically isolate the interface transducers from extraneous noise.

The present invention will be of great benefit to users who find they would otherwise suddenly be without the ability to conveniently couple their telephone systems to computers. Further, users will not be forced to make special provision for their acoustic coupler interface devices, such as retaining old style handsets specifically for the purpose of use with acoustic couplers.

SUMMARY OF THE INVENTION

The present invention is directed to an adapter that adapts the non-standard telephone mouthpiece for use in situations where equipment has been designed to acoustically interface with the standard configuration mouthpiece. The invention provides the ability to use existing acoustic coupler mouthpiece muff designs and installed equipment with either style of telephone handset without extensive revision to that equipment.

The present invention is comprised of a flat circular base portion and a cup-shaped portion extending from one side of the base. The cup-shaped portion has a lateral opening extending toward the center of the cup portion and base portion, forming a cavity. Small diameter holes or a diaphragm may be provided in a central area of the cavity, allowing tones or pulses to pass through the base portion. The diameter of the base portion matches that of the standard configuration handset mouthpiece.

The shape of the opening and cavity in the cup-shaped portion is such that it mates with the non-standard mouthpiece, which is inserted into the opening and fits into the cavity such that the mouthpiece of the non-standard handset is placed adjacent to the holes or diaphragm, allowing sound to pass through the base portion. Because the present invention is made from molded hard rubber, the non-standard handset may be pressure-fit into the mouthpiece opening, thereby securely attaching the present invention to the handset and ensuring proper seating of the handset in the invention. When the non-standard handset is engaged in the present invention, the transducer is sealed against outside noise and is located the proper distance from the receiving transducer of the acoustic coupler to facilitate proper and clear reception of tones and pulses. In addition, the base and cavity are configured so that, when a handset is inserted into the cavity, the face of the base and the face of the earpiece will have a relative angle that is approximately the same as a standard handset.

BRIEF DESCRIPTION OF THE DRAWINGS

FIG. 1 is a perspective view of a prior art non-standard handset adapter;

FIG. 2 is a perspective view of a preferred embodiment of the present invention;

FIG. 3 is a cross-section of a preferred embodiment of the present invention;

FIG. 4 is a cross-section of a non-standard handset attached to a preferred embodiment of the present invention and placed in an acoustic coupler mouthpiece muff designed for use with a standard-configuration mouthpiece.

DETAILED DESCRIPTION OF THE DRAWINGS

Shown in FIG. 1 is a prior art non-standard handset adapter 90. The prior art adapter consists of a cradle 92 into which the non-standard handset is placed. One side of the cradle is provided with two cavities 94, 96 that act as receptacles for the mouthpiece and earpiece of a non-standard handset (not shown). The opposite side of the cradle is provided with two extensions 98, 100 shaped so as to resemble the mouthpiece and earpiece of the standard configuration handset. Channels 102, 104 connect the cavities 94, 96 to their respective cradle extensions 98 and 100.

The coupler of FIG. 1 has several disadvantages when compared with the present invention. First of all, when the prior art adapter is used the distance from the mouthpiece to the acoustic coupler transducer is changed from the distance when a standard handset is used. The present invention does not change this distance. Secondly, as a result of this changed distance, the volume of air surrounding the transducer is changed. This may result in resonances that adversely affect the transmission of data. Furthermore, because acoustic couplers have been designed assuming a predetermined mouthpiece to transducer distance, the increased distance imposed by use of the prior art adapter presents problems of signal attenuation as well as resonance. Lastly, the prior art adapter is bulky and therefore very inconvenient to use.

Shown in FIG. 2 is an adapter 14, in accordance with a preferred embodiment of the present invention, which is comprised of a circular base portion 16 having a diameter roughly equal to that of the standard configuration mouthpiece. Extending from one side of the base portion 16 is a generally hemispherical-shaped portion 18, having an opening 20 for insertion of the non-standard mouthpiece. The adapter is preferably formed of a compliant material such as rubber.

The cross-section of the present invention 14 shown in FIG. 3 again illustrates the base portion 16 and hemispherical-shaped portion 18. The central area 22 at the end of the opening 20 includes one or more channels 24 passing from the opening through the base portion 16. The channels allow sound tones or pulses to pass from the non-standard mouthpiece (not shown) through the base portion 16, where the sound is received by the transducer of an acoustic coupler.

FIG. 4 shows a preferred embodiment of the present invention in use. The adapter 14 is placed over the mouthpiece end 28 of a non-standard handset 26. The adapter-mouthpiece combination is then placed in the mouthpiece muff 12 of an acoustic coupler, just as a standard mouthpiece would be used. The generally square earpiece of the non-standard handset is close enough to the configuration of the standard handset such that effective coupling can be achieved without the necessity for an adapter. In addition, the adapter 14 is designed so that the face of the base 16 forms a relative angle with the face of the earpiece 30 that is approximately equal to the mouthpiece-to-earpiece angle of the standard handset. This ensures effective coupling of both the mouthpiece and earpiece to an acoustic coupler.

The present invention therefore provides a low-cost, convenient and effective means of enabling non-standard handsets to be used with acoustic couplers intended for use with standard phones. Although a particular embodiment has been described, it will be appreciated that modifications may be made without departing from the scope of the invention.

What is claimed is:

1. An adapter for acoustically coupling a telephone handset having a generally rectangular mouthpiece with an acoustic coupler interface device having circular acoustic coupling cups that are designed for use with telephone handsets having a circular mouthpiece and circular earpiece, the adapter comprising:

a circular base portion for mating engagement with a circular acoustic coupling cup of the interface device; and a generally cylindrical body portion integral with and extending from one side of the base portion, wherein the body portion has a substantially rectangular opening extending toward the base portion, the opening forming a cavity for receiving a telephone handset mouthpiece, said cavity terminating adjacent the center of the base portion, wherein the adapter includes an acoustic coupling passage formed in the body and base portions for allowing acoustic transmission from the handset mouthpiece through the cavity and out the base portion; and wherein the mouthpiece of the handpiece is coupled to the acoustic coupler via the adapter and the earpiece of the handset is directly coupled to the acoustic coupler.

2. The adapter of claim 1 wherein the acoustic coupling passage is comprised of at least one channel passing from the cavity through the base portion.

3. An adapter as in claim 2 wherein the body portion includes a tapered upper portion extending away from the base portion.

* * * * *